Figure 2:
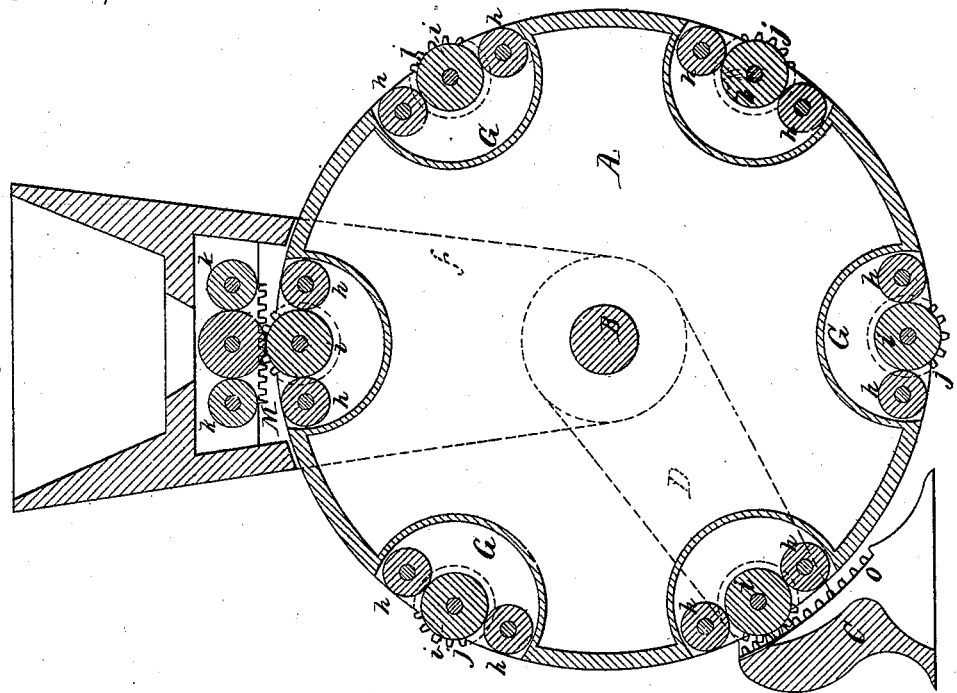

2 Sheets--Sheet 1

O. HYDE.
Improvement in Seed-Planters.

No. 131,400. Patented Sep. 17, 1872.

Witnesses.
Geo. H. Strong.
A. T. Dewey.

Inventor:
Oliver Hyde
By his Attys.
Dewey & Co.

2 Sheets--Sheet 2.

O. HYDE.

Improvement in Seed-Planters.

No. 131,400.

Patented Sep. 17, 1872.

Witnesses.
Geo. H. Strong
A. T. Dewey

Inventor:
Oliver Hyde
By his Atty's
Dewey & Co.

UNITED STATES PATENT OFFICE.

OLIVER HYDE, OF OAKLAND, CALIFORNIA.

IMPROVEMENT IN SEED-PLANTERS.

Specification forming part of Letters Patent No. 131,400, dated September 17, 1872.

*To all whom it may concern:*

Be it known that I, OLIVER HYDE, of Oakland, county of Contra Costa, State of California, have invented Improved Seed Planter and Drill; and I do hereby declare the following description and accompanying drawing are sufficient to enable any person skilled in the art or science to which it most nearly appertains, to make and use my said invention or improvements without further invention or experiment.

My invention relates to an improved seed planter and drill by means of which the seed furrow is opened and the seed automatically taken from a hopper and deposited in hills at a proper distance apart along the furrow.

In order to explain my invention sufficiently to enable others to make and use the same, reference is had to the accompanying drawing forming a part of this specification, in which—

A represents a single broad wheel or one of a series having a shaft or axle, B, passing through its center and extending any desired distance on both sides. C is the drill or furrow-opener, which consists of two mold-boards united at their front edges so as to form a sharp upright or edge for breaking the soil, while the widening mold-boards spread it so as to form the furrow. This drill is attached to the wheel by means of side pieces D, one end of which is firmly attached to the drill, while the opposite end is secured loosely upon the projecting ends of the shaft B. E is a hopper, whose sides $f$ extend downward and are also secured loosely upon the shaft B and are fixed to the pieces D of the drill, so that the drill and hopper will always be retained in the same relative position with each other —that is, so that when the hopper stands vertical the drill will be carried in front of the wheel A in a line with its bearing upon the ground. At intervals around the circumference of the wheel small chambers G are made in its face, and in these chambers are placed two or three elastic rollers, $h\,h\,i$, so that they will close the outer portion of the chamber. The two end rollers $h\,h$ are smaller than the middle one $i$, and are placed loosely upon the shafts which bear in the opposite sides of the wheel, so that they can be revolved upon it by the friction of the large middle roller. The large middle roller $i$ is fixed firmly upon a similar shaft, which extends a short distance outside of the wheel upon one side, so as to carry a small toothed wheel, $j$, and on the opposite side of the chamber is a rack, N. In the bottom of the hopper E are elastic rollers K K, which may be revolved by a toothed wheel, $l$, at the end of the shaft upon which it is fixed. On the under side of the hopper, opposite this toothed wheel $l$, is a rack, M; also on the drill, in the track of the toothed wheel $j$, is another rack, O.

Figure 1:
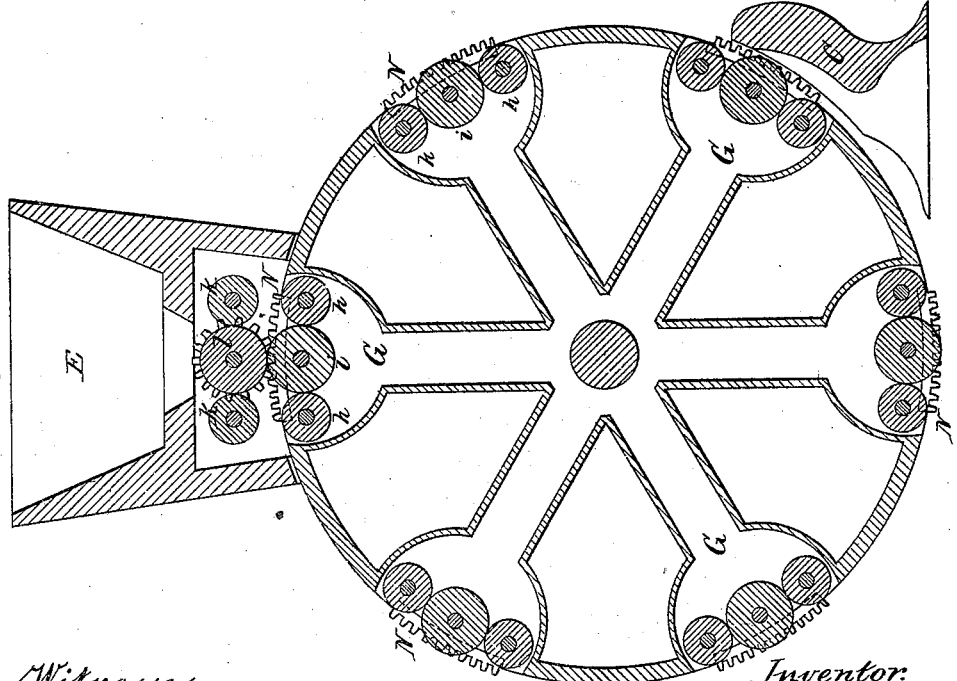
Figure 3:
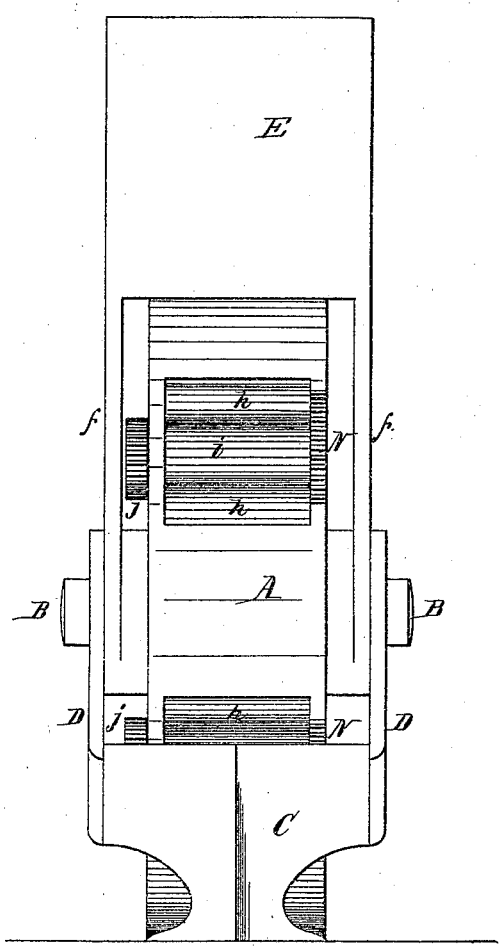

In operation, this planter will be provided with a seat, and horses will be attached in a manner readily applied by any one, for moving it across the fields, or attached to a steam-plow in a series of as many on one shaft as are necessary. The hopper having been filled with grain and the horses started forward, the wheel A will be revolved by its bearing upon the ground, and as each chamber passes under the hopper, the rack N will cause the toothed wheel $l$ to revolve, consequently revolving the elastic roller K in the bottom of the hopper, which will carry down a small quantity of the seed from the hopper and deposit them upon the elastic rollers in the chamber. Simultaneously with the above operation the toothed wheel $j$ will move under the rack M on the opposite side of the wheel and cause the rollers $h\,h\,i$ to revolve, which will carry the seed on down into the chamber beneath the rollers. The seed will then remain in the chamber until in the revolution of the wheel it arrives above the drill, at which point the toothed wheel $j$ will move over the rack O and cause the rollers $h\,h\,i$ to feed the grain into the furrow in the rear of the drill. Instead of the chambers G, internal pipes or tubes may be employed for conveying the grain from the rollers under the hopper to the rollers over the drill, as shown at Fig. 1, or the hopper may be entirely dispensed with for small operations, and the wheel A made hollow and the grain placed inside of the wheel, in either of which cases the toothed wheels moving over the rack on the drill will feed a certain number or quantity of seed into the furrow.

By this means I provide a seed planter and drill combined in a single, cheap, simple, and convenient machine by which the entire planting can be automatically accomplished in a thorough and systematic manner at equal distances apart.

Having thus described my machine, what I claim and desire to secure by Letters Patent, is—

1. The bearing-wheel A, with its chambers or recesses G, in combination with the elastic feed-rollers $h\ h\ i$, and operating toothed wheel $j$, and rack $h$, substantially as and for the purpose above described.

2. The bearing-wheel A, with its recesses G, feed-rollers $h\ h\ i$ and toothed wheel $j$, in combination with the drill or furrow-opener C, with its rack N, substantially as and for the purpose above described.

3. The bearing-wheel A, with its recesses G, feed-rollers $h\ h\ i$ operating toothed wheel $j$, and rack N, in combination with the hopper E with its elastic roller K, toothed wheel $l$, and rack M, substantially as and for the purpose above described.

4. The combined seed planter and drill, consisting of the bearing-wheel A with its chambers G, elastic rollers $h\ h\ i$, toothed wheel $j$, and rack N, the hopper E with its elastic feeding-roller K, toothed wheel $l$, and rack M, and the drill or furrow-opener C with its rack O, all constructed, combined and arranged in the manner above described.

In witness whereof I have hereunto set my hand.

OLIVER HYDE.

Witnesses:
J. L. BOONE,
A. T. DEWEY.